US010969289B2

(12) United States Patent
DeRosa et al.

(10) Patent No.: US 10,969,289 B2
(45) Date of Patent: Apr. 6, 2021

(54) FIELD SERVICEABLE, SMALL FORM-FACTOR PRESSURE SCANNER

(71) Applicant: KULITE SEMICONDUCTOR PRODUCTS, INC., Leonia, NJ (US)

(72) Inventors: Louis DeRosa, Wayne, NJ (US); Joseph R. VanDeWeert, Maywood, NJ (US); Steve Kleiber, Leonia, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 236 days.

(21) Appl. No.: 16/257,442

(22) Filed: Jan. 25, 2019

(65) Prior Publication Data
US 2019/0234823 A1 Aug. 1, 2019

Related U.S. Application Data

(60) Provisional application No. 62/622,455, filed on Jan. 26, 2018.

(51) Int. Cl.
G01L 15/00 (2006.01)
G01L 13/00 (2006.01)
G01L 19/14 (2006.01)

(52) U.S. Cl.
CPC ............ *G01L 19/147* (2013.01); *G01L 13/00* (2013.01); *G01L 15/00* (2013.01); *G01L 19/14* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 4,263,655 A * 4/1981 Chappell, Jr. ........ G05B 19/054
318/562
4,442,716 A * 4/1984 Coe ...................... G01L 19/147
340/870.13
(Continued)

OTHER PUBLICATIONS

Kulite Semiconductor Products, Inc., Pressure Scanner Instruction Manual Version 2.5.0 and Higher, KMPS-1-64 Manual, 38 pages.
(Continued)

*Primary Examiner* — Andre J Allen
(74) *Attorney, Agent, or Firm* — Troutman Pepper Hamilton Sanders LLP; James E. Schutz; Mark Lehi Jones

(57) ABSTRACT

The disclosed technology relates to a field serviceable pressure scanner suitable for high-pressure sensing applications and replacement of large pressure transmitter panels. The pressure scanner includes a housing having a mounting plate comprising a plurality of through-hole bores extending from a front to back side for mating with corresponding transducer ports of the pressure sensors, and a plurality of input ports disposed on the front side of the mounting plate and in communication with the corresponding plurality of through-hole bores. The pressure scanner assembly includes two or more field-replaceable (swappable) pressure sensors seal mounted to the back side of the mounting plate, each pressure sensor comprising one or more sensor ports, each of the one or more sensor port in communication with corresponding through-hole bores in the mounting plate, and a multi-channel data acquisition system configured to receive pressure signals from the two or more field-replaceable pressure sensors.

20 Claims, 5 Drawing Sheets

(58) Field of Classification Search
CPC ... G01L 13/025; G01L 19/14; G01L 19/0038;
G01L 19/0084; G01L 9/0055; G01L
9/0075; G01L 19/0069; G01L 9/0052;
G01L 9/0073; G01L 19/0092; G01L
19/0618; G01L 19/0645; G01L 19/143;
G01L 9/0051; G01L 19/0007; G01L
19/0046; G01L 19/06; G01L 19/0627;
G01L 19/0681; G01L 27/002; G01L 9/00;
G01L 9/0041; G01L 9/0044; G01L
11/025; G01L 11/04; G01L 19/0023;
G01L 19/0672; G01L 19/069; G01L
19/142; G01L 19/145; G01L 19/16; G01L
7/00; G01L 9/0047; G01L 9/06; G01L
9/065; G01L 9/12; G01L 11/02; G01L
13/00; G01L 15/00; G01L 19/0015; G01L
19/003; G01L 19/02; G01L 19/0609;
G01L 19/083; G01L 19/10; G01L 19/148;
G01L 27/005; G01L 7/08; G01L 7/082;
G01L 7/163; G01L 7/166; G01L 9/0045;
G01L 9/0048; G01L 9/006; G01L 9/007;
G01L 9/0076; G01L 9/04; G01L 9/045;
G01L 9/125; G01L 11/00; G01L 17/00;
G01L 19/00; G01L 19/0076; G01L 19/08;
G01L 19/141; G01L 19/146; G01L 1/142;
G01L 1/2262; G01L 1/246; G01L 21/12;
G01L 23/16; G01L 27/007; G01L 7/04;
G01L 7/063; G01L 7/084; G01L 7/086;
G01L 7/16; G01L 9/0002; G01L 9/0007;
G01L 9/0016; G01L 9/0019; G01L
9/0022; G01L 9/0027; G01L 9/0033;
G01L 9/0039; G01L 9/005; G01L 9/0058;
G01L 9/0077; G01L 9/0079; G01L 9/008;
G01L 9/0092; G01L 9/0095; G01L 9/025;
G01L 9/08; G01L 9/085; G01L 9/105;
G01L 9/14; G01L 9/16

See application file for complete search history.

(56) References Cited

U.S. PATENT DOCUMENTS

| 4,753,105 | A | * | 6/1988 | Juanarena | G01L 19/0015 |
| | | | | | 73/1.62 |
| 7,743,662 | B2 | | 6/2010 | Kurtz | |
| 8,061,213 | B2 | | 11/2011 | Kurtz et al. | |
| 9,372,131 | B2 | | 6/2016 | Martin et al. | |
| 9,470,325 | B2 | | 10/2016 | DeRosa et al. | |
| 9,709,452 | B2 | | 7/2017 | Norian et al. | |
| 9,739,681 | B2 | | 8/2017 | Landmann | |
| 10,768,068 | B2 | * | 9/2020 | Martin | G01L 9/0052 |
| 2005/0222794 | A1 | * | 10/2005 | Baird | G01L 27/002 |
| | | | | | 702/104 |
| 2016/0313202 | A1 | * | 10/2016 | Martin | G01L 15/00 |
| 2016/0357697 | A1 | | 12/2016 | Landmann | |

OTHER PUBLICATIONS

Dry Gas Seal Systems for Centrifugal Compressors, COMPRESSORtech2, Aug. 2, 2017, 15 pages, https://compressortech2.com/dry-gas-seal-systems-for-centrifugal-compressors/.

Schmidt, Glenn, EagleBurgmann, Control, seal health, seal leakage and vent lines must be monitored for proper function, Pumps & Systems, Jul. 26, 2012, 16 pages, https://www.pumpsandsystems.com/topics/seals/mechanical-seals/effective-dry-gas-0812.

Esterline Pressure Systems, Intelligent Pressure Scanner User's Manual (Models 9016, 9021, 9022), 13th Edition, Sep. 2007, 194 pages.

* cited by examiner

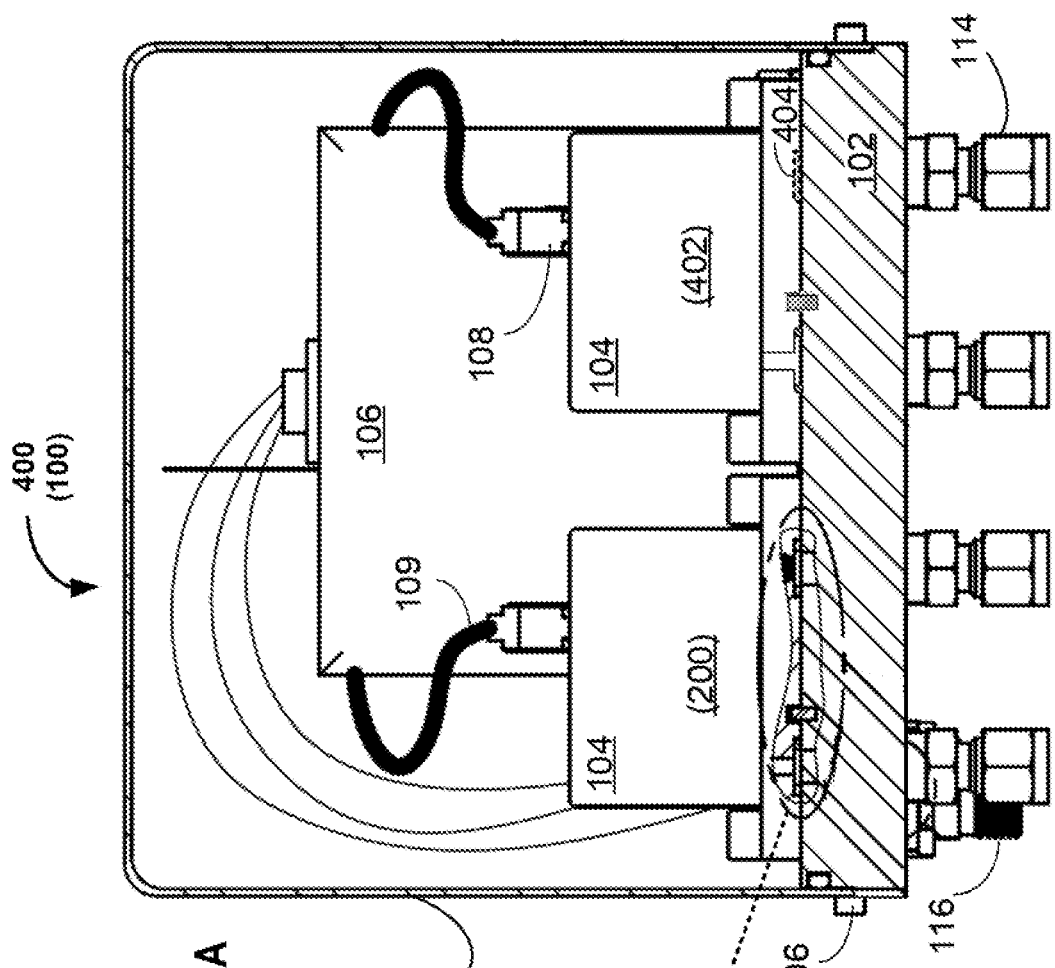
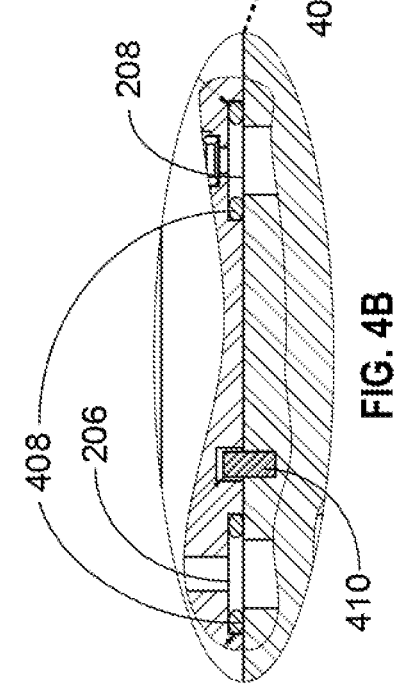
FIG. 4A
FIG. 4B

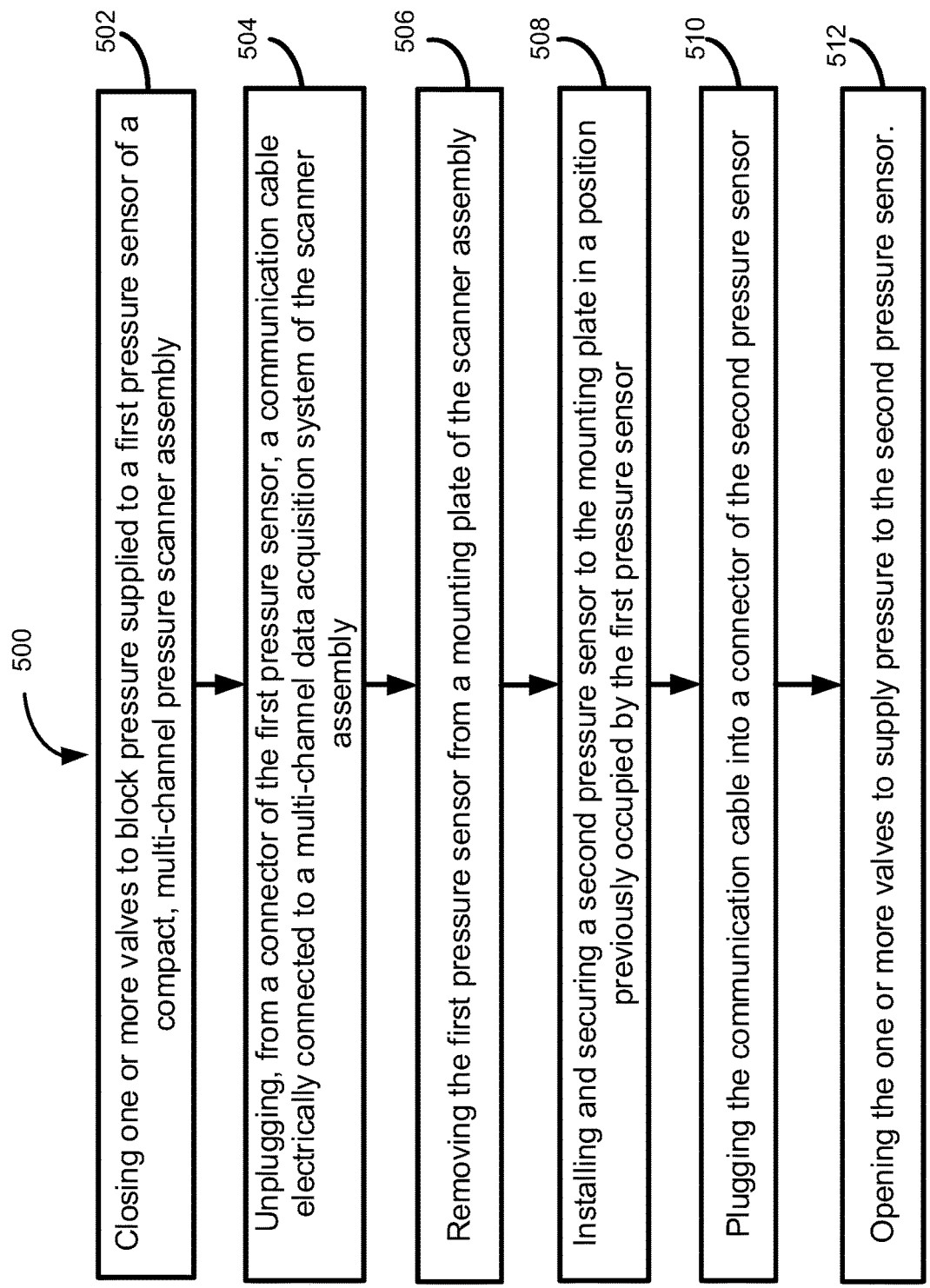

FIELD SERVICEABLE, SMALL FORM-FACTOR PRESSURE SCANNER

CROSS-REFERENCE TO RELATED APPLICATION

This application claims priority under 35 U.S.C. 119 to U.S. Provisional Patent Application No. 62/622,455, entitled "Replacement of Large Pressure Transmitter Panels," filed Jan. 26, 2018, the contents of which are incorporated by reference in their entirety as if fully set forth herein.

FIELD

The disclosed technology relates to a field serviceable, small form-factor pressure scanner suitable for high-pressure sensing applications and replacement of large pressure transmitter panels.

BACKGROUND

In the oil and gas industry, there are many installations where large panels of pressure transmitters are used to monitor pressures in a system. For example, seal gas panels may utilize banks of transmitters to monitor the flow of gas, conditions of filters, and other pressures. See for instance "Dry Gas Seal Systems for Centrifugal Compressors" (CompresorTech2, June 2017) or "An Effective Dry Gas Seal Panel" (Pumps and Systems July 2012).

Conventional pressure monitoring panels are very large and bulky due to the collections of piping, valves, sensors, transmitters, electronics, wiring, and other associated components. Such panels can be very large, having dimensions of more than 10 feet high and 10 to 20 feet wide, and making it difficult to find adequate space close to machinery where the pressure measurements are to be made. One approach to address the issue of bulky panels in limited space is to install the panel in a remote location and run long sections of tubing to the machinery. This approach can present several disadvantages: it often takes up even more space, it is expensive to run the tubing, and it creates the potential for more leaks.

U.S. Pat. No. 8,061,213 entitled "High Temperature, High Bandwidth Pressure Acquisition System," assigned to Kulite Semiconductor Products, Inc., and incorporated herein by reference, discloses an acquisition system for measuring pressures from multiple individual transducer assemblies that can be positioned on various points along a model to be tested and in extreme environmental conditions (such as on an aircraft wing or some other object placed in a wind tunnel). In one embodiment, a given transducer assembly may be permanently assigned to a corresponding fixed channel of the acquisition system and programmed with permanent compensation coefficients. In another embodiment, a memory chip attached to each transducer may store compensation coefficients so that any transducer may be plugged into any channel of the acquisition system. The acquisition system can be placed in a safer environment and may receive data from each of the sensors via a digital bus.

U.S. Pat. No. 7,743,662 entitled "Low Differential Pressure Transducer," assigned to Kulite Semiconductor Products, Inc., and incorporated herein by reference, discloses an oil-filled, two-diaphragm, differential pressure transducer having an "H"-shaped header. The header provides space for electrical leads to connect with the internal transducer bridge while allowing the first and second diaphragms to be of equal diameter and size, thereby enabling the diaphragms to exhibit compliant back pressure to the common oil-filled cavity for transmitting differential pressure to a transducer bridge, and in turn, allowing lower differential pressures to be measured.

Certain pressure scanners, such as pressure scanner model KMPS-1-64 from Kulite Semiconductor Products, Inc., may be utilized to monitor multiple pressures (generally 16 to 64) in a very small area. This pressure scanner is described in U.S. Pat. No. 9,372,131, entitled "Pressure Scanner Assemblies Having Replaceable Sensor Plates," assigned to Kulite Semiconductor Products, Inc., and incorporated herein by reference. This patent discloses a small form-factor pressure scanner assembly having multiple pressure transducers attached to swappable sensor plates, which allow banks of multiple pressure transducers to be replaced along with their associated multiplexing and/or compensation electronics.

Other small form-factor scanner systems (such as pressure scanner model 9016 from Pressure Systems Inc.) are commercially available and may be used with external transducers.

The above-mentioned pressure systems can be very compact, but they lack some of the features necessary to make them suitable robust replacements for transmitters in certain high-pressure applications, particularly in applications needing flexible infield servicing, for example, to unclog internal pressure lines or to replace any single defective transducer. A need exists for systems and methods that address such issues.

BRIEF SUMMARY

Certain example implementations of the disclosed technology include a field-serviceable, small form-factor pressure scanner assembly having multiple pressure transducers. Embodiments of the disclosed technology can include a housing/transducer infrastructure that provides improved configuration flexibility for various pressure sensing applications. Certain example implementations of the disclosed technology enable individual pressure transducers to be selected and installed in the assembly for a given application while enabling individual pressure transducers to be replaced, serviced, and/or re-configured in the field.

In accordance with certain example implementations of the disclosed technology, a pressure scanner assembly is provided that includes a mounting plate having a back-side sensor mounting interface configured for simultaneous mounting of single-input and dual-input pressure sensors. The pressure scanner assembly further includes a plurality of field-swappable pressure sensors attached to the sensor mounting interface, wherein each of the plurality of field-swappable pressure sensors may be in communication with one or more corresponding input ports disposed on a front-side of the mounting plate. The pressure scanner assembly further includes a multi-channel data acquisition system configured to receive pressure signals from the plurality of field-swappable pressure sensors.

In another example implementation, a field serviceable, compact, multi-channel pressure scanner assembly is provided. The assembly can include a housing configured to house pressure sensors and a data acquisition assembly, the housing occupying a volume of between 0.025 cubic meters and 0.03 cubic meters, and comprising: a mounting plate comprising a plurality of through-hole bores extending from a front side to a back side of the mounting plate and configured for mating with corresponding transducer ports of the pressure sensors; and a plurality of input ports disposed on the front side of the mounting plate and in communication with the corresponding plurality of through-hole bores. The assembly can include two or more field-replaceable pressure sensors seal mounted to the back side of the mounting plate, each pressure sensor comprising one or more sensor ports, each of the one or more sensor port in communication with corresponding through-hole bores in the mounting plate; and a multi-channel data acquisition system configured to receive pressure signals from the two or more field-replaceable pressure sensors.

A method is also provided for replacing a field-replaceable pressure sensor in a compact, multi-channel pressure scanner assembly during operation. The method can include closing one or more valves to block pressure supplied to a first pressure sensor of a compact, multi-channel pressure scanner assembly. The method can include unplugging, from a connector of the first pressure sensor, a communication cable electrically connected to a multi-channel data acquisition system of the scanner assembly. The method can include removing the first pressure sensor from a mounting plate of the scanner assembly and installing and securing a second pressure sensor to the mounting plate in a position previously occupied by the first pressure sensor. The method can include plugging the communication cable into a connector of the second pressure sensor. The method can include opening the one or more valves to supply pressure to the second pressure sensor.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

FIG. 4A depicts a cross-sectional end-view of a pressure scanner assembly 400 (which may correspond to the assembly 100 as shown in FIG. 1A, FIG. 1B, and FIG. 3), having both a differential sensor 200 and a single-input sensor 402 installed in the assembly 100, according to an example implementation of the disclosed technology.

FIG. 4B depicts a detailed inset view of an interface between an installed differential sensor 200 and the mounting plate 102.

FIG. 5 is a flow diagram of a method 500 for replacing a field-replaceable pressure sensor in a compact, multi-channel pressure scanner assembly during operation, according to an example implementation of the disclosed technology.

DETAILED DESCRIPTION

The disclosed technology includes systems and methods related to improved pressure transducer scanner panel assemblies, and in particular, to certain configurations that can provide a robust pressure acquisition system having a compact footprint while allowing individual sensors to be swapped-out, replaced, or serviced without disturbing other sensors in the assembly. Certain implementations may enable replacing/servicing individual sensors in the assembly during operation, so that other sensors in the assembly may continue to operate and take pressure measurements during the replacing/servicing process. Certain example implementations of the disclosed technology can provide for flexible use of both single-input (absolute) and dual-input (differential) sensors. Certain features disclosed herein may be utilized and/or combined in a new way with features described in the incorporated references to address some of the challenges associated with conventional pressure scanner systems.

Certain example implementations of the disclosed technology include a pressure scanner that enables simultaneous, individual pressure measurements in a small space while providing improved flexibility, robustness, and field-serviceability of individual pressure transmitters. The disclosed technology provides improved configuration flexibility of a pressure scanner, in which individual pressure transducers may be selected (and/or configured) for use in a given application. Certain example implementations of the disclosed technology provide an improved housing/transducer layout and mating infrastructure that enables individual pressure transducers of an array to be replaced, serviced, and/or re-configured at the measurement site (i.e., in the field) without requiring an entire bank of transducers to be replaced. Certain example implementations of the disclosed technology may utilize a high-temperature, high-bandwidth data acquisition system along with a plurality of robust, pressure sensors to address certain challenges related to conventional pressure scanner panels.

Figure 1A:
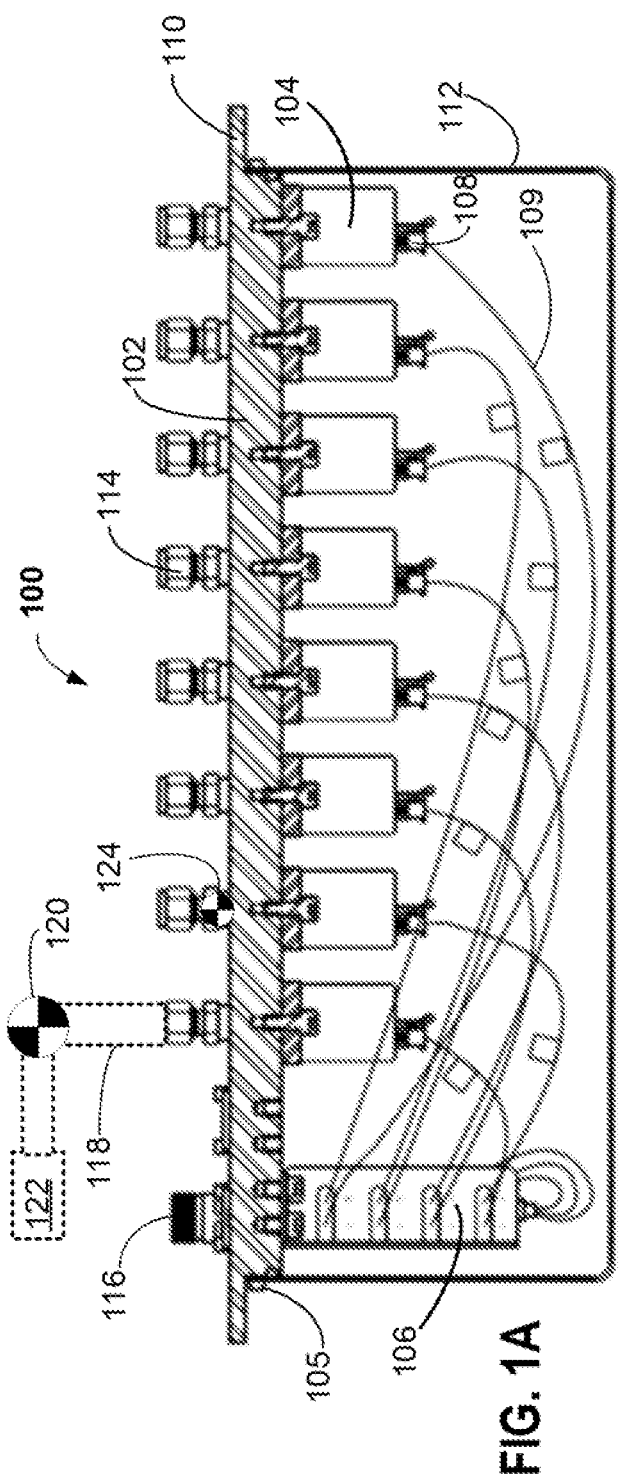
FIG. 1A depicts a cross-sectional side-view of a pressure scanner assembly 100, according to an example implementation of the disclosed technology.
Figure 1B:
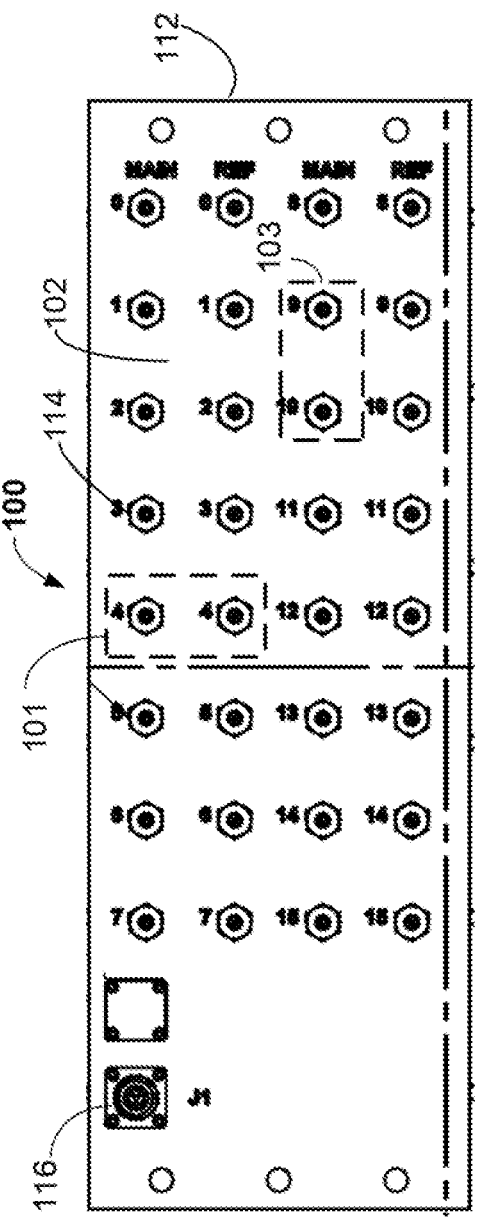
FIG. 1B depicts a panel face-view of the pressure scanner assembly 100, according to an example implementation of the disclosed technology.

FIG. 1A depicts a cross-sectional side-view of a pressure scanner assembly 100 according to an example implementation of the disclosed technology. FIG. 1B depicts a panel face-view of the pressure scanner assembly 100, according to an example implementation of the disclosed technology.

Figure 3:
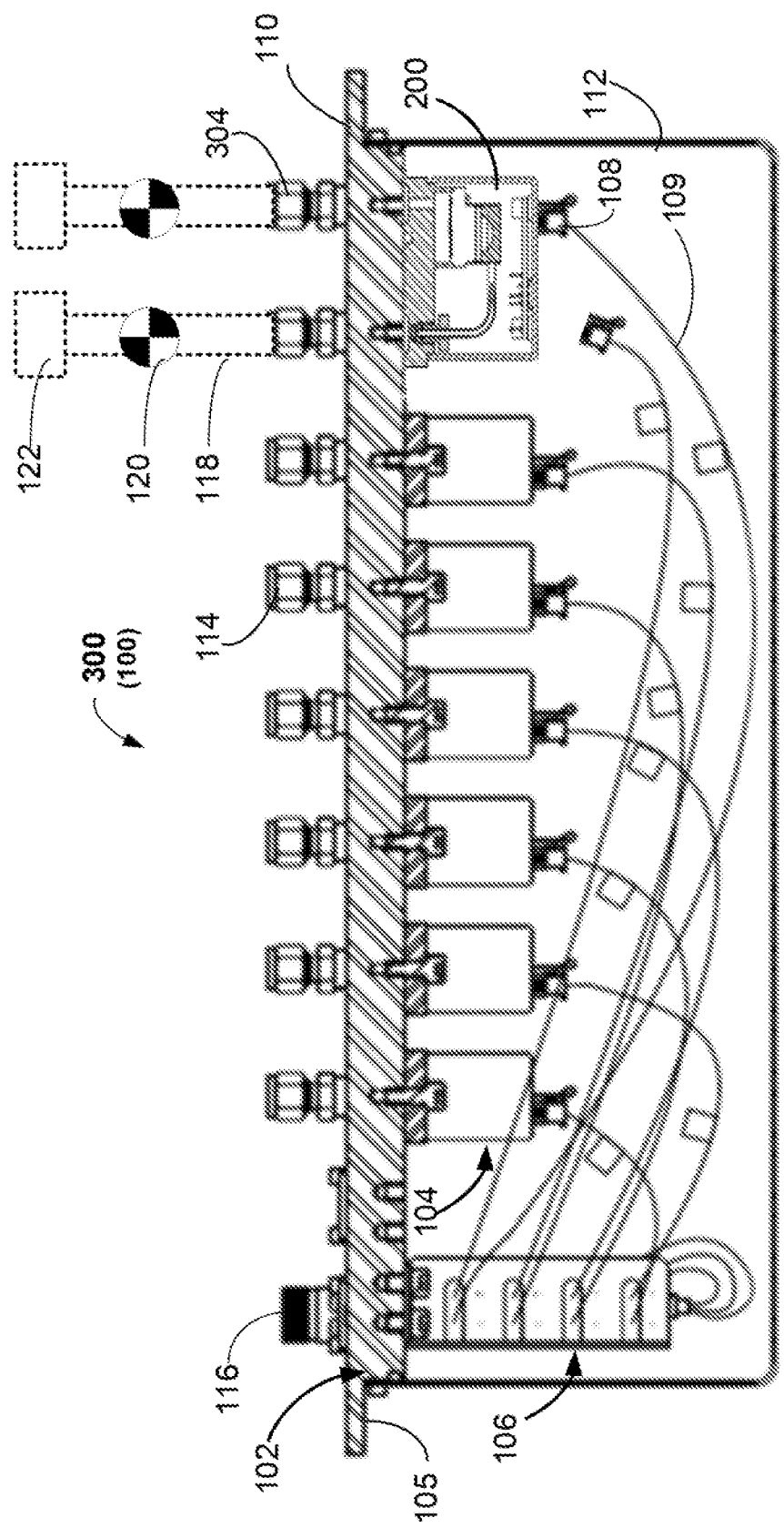
FIG. 3 depicts a pressure scanner assembly 300 (which may correspond to the assembly 100 as shown in FIG. 1A and FIG. 1B) having various sensors 104 including sensors 104 installed in a first orientation and a differential sensor 200 (as shown in FIG. 2) installed in a second orientation and in communication with two input ports.

In certain implementations, the assembly 100 can include a multi-channel pressure scanner housing configured to house individual pressure sensors 104 that can be either single-input (absolute) or dual-input (differential) sensors, as will be explained below. In this figure, each of the pressure sensors 104 are depicted in a first orientation (such as orientation 101 as depicted in FIG. 1B). Certain example implementations of the disclosed technology may provide for installing some or all of the pressure sensors 104 in a second orientation 103 (as shown in FIG. 3) to provide added flexibility. In certain example implementations, the housing may be configured to accommodate a 16-channel pressure scanner (with associated pressure sensors 104). In other disclosed implementations, the number of channels and associated sensors 104 may be configured, as needed, ranging from 2 to 64.

According to certain example implementations of the disclosed technology, the size of the housing may scale according to factors such as the number and/or type(s) of sensors 104 used. In certain example implementations, the housing may be configured to allow for field inspection, maintenance, and/or repair (such as field replacement of individual sensors 104, unclogging associated tubing or input ports 114, etc.). One implementation of the disclosed technology may be utilized as a 16-channel scanner panel in a glass seal application, with the housing having dimensions of approximately 18"×10"×10" (~46 cm×26 cm by 26 cm).

Such compact size of the housing may allow installation of the assembly 100 in a small space while allowing access to sensor mounting fasteners (such as nuts or screws) for example, via a wrench or other tool, and to enable swapping individual sensors 104 without disturbing other installed sensors in the assembly 100.

According to an example implementation of the disclosed technology, the pressure scanner assembly 100 may include a data acquisition system 106 in communication with the individual sensors 104 via individual cables 109. For example, in a 16-channel system, the data acquisition system 106 may connect to 16 individual pressure sensors 104 with 16 individual cables 109. The cables 109 may be connected to the sensors 104 with electrical connectors allowing for easy disconnection for maintenance and/or removal and replacement of individual sensors 104. In certain example implementations, the cables 109 may be coaxial cables having connectors for quick and easy attachment to sensors 104 on one end, and the data acquisition system 106 on the other end. In certain example implementations, a ribbon cable and/or backplane (not shown) may be utilized to communicate the measurement data from the sensors 104 to the acquisition system 106.

In accordance with certain example implementations of the disclosed technology, the data acquisition system 106 may be configured to detect when any one of the sensors 104 is missing, defective, not plugged in, and/or providing measurement signals that are out of range. In certain example implementations, the data acquisition system 106 may periodically read the sensor 104 identifying information on each channel, and if such information is missing or can't be read, the corresponding channel may have the corresponding sampling temporarily turned off until the identification information is again detected. In certain example implementations, the sampling rate of the remaining channels may be increased by reducing the number of active sensors.

According to an example implementation of the disclosed technology, the pressure scanner assembly 100 may be configured with different sensors 104, for example, having different pressure ranges and/or modes (for example, absolute, differential, gauge, etc.), which may enable configuring the assembly 100 to measure many different process variables. In certain example implementations, each sensor 104 may be configured to measure a different pressure range and/or mode. In certain example implementations, one or more of the sensors 104 may be configured with the same or similar pressure range and/or mode.

In certain example implementations, one or more of the sensors 104 may include compensation means, for example, to adjust the sensor response for environmental and other factors such as temperature, pressure range, humidity, etc., as described in U.S. Pat. No. 9,709,452, entitled "Systems and Methods for Compensating a Sensor," assigned to Kulite Semiconductor Products, Inc., and incorporated herein by reference. In certain example implementations, one or more configurable resistor networks in communication with one or more of the input and output terminals of the sensor 104 may be used to reduce or eliminate response errors. In certain example implementations, the compensation circuitry may be built-in to the individual sensor 104. In other example implementations, as will be described below, compensation and/or other processing may be performed externally based on determining an identification of the sensor.

In certain example implementations, the sensor 104 may include a memory module with stored information that the data acquisition system 106 can read. According to an example implementation of the disclosed technology, such stored information can include one or more of: a serial number, a sensor type, pressure range, and compensation parameters, as discussed in U.S. Patent Application Publication No. 20160357697, entitled "Systems and Methods for Multibit Code Communications," assigned to Kulite Semiconductor Products, Inc., and incorporated herein by reference.

In an example implementation, one or more of the sensors 104 may be configured with an identification (ID) that can be read by the data acquisition system 106. For example, the ID may be utilized by the data acquisition system 106 to determine the type, range, parameters, etc., of a particular sensor 104 so that the data acquisition system 106 can configure the input and/or apply the proper compensation to the sensor 104 based on the ID. In one example implementation of the disclosed technology, the ID can be the serial number uniquely assigned to each sensor 104. In certain implementations, the serial number may be printed on the body of the transducer. According to an example implementation of the disclosed technology, characteristics of the particular sensor may be stored in a database (or look-up table) and associated with the serial number.

In accordance with certain example implementations of the disclosed technology, a Transducer Electronic Data Sheet (TEDS) may be utilized to identify a particular sensor 104. In this example implementation, a small memory chip that can be installed in the sensor and the memory can be addressed and read by an external reader (such as the data acquisition system 106) using one or two additional conductors. The memory can store information besides the serial number, such as the part number, manufacturing date, last calibration date, pressure range, as well as individual coefficients which, when used with a polynomial function, may be used to reduce various errors associated with the transducer.

In certain example implementations, such as in high-temperature or other extreme environment applications where active electronics may pose a reliability issue (i.e., due to EMI, lightning or ESD), the ID associated with the sensor 104 may be encoded by passive resistors or other components within the sensor 104 and the data acquisition system may use a look-up table for determining the proper compensation, range, etc. Certain example implementations of the disclosed technology provide for manufacturing transducers with distinct internal IDs, without requiring any active electronic memory circuits, as discussed in U.S. Pat. No. 9,739,681, entitled "Systems and Methods for Electrically Identifying and Compensating Individual Pressure Transducers," and incorporated herein by reference. Certain implementations may utilize passive resistive elements selected and arranged to provide distinct combined resistance values that may be electronically interrogated and referenced to corresponding distinct IDs.

In accordance with certain example implementations of the disclosed technology, the data acquisition system 106 may be configured to output multiplexed data received from multiple sensors 104 over a digital bus, such as Ethernet, CAN, MODBUS, etc., via a signal output port 116. In contrast, certain conventional systems may require individual data acquisition system and/or individual transmitters for each sensor, each of which may require protection from the elements and can add bulk to such conventional systems.

With continued reference to FIG. 1A, and according to certain example implementations, the various components (such as the sensors 104 and data acquisition system 106)

may be mounted to a back side of a mounting plate 102 of the assembly 100. The mounting plate 102 can include mounting flanges 105 configured to allow mounting of the assembly 100 to an equipment rack or other external structure (not shown). The assembly 100 may include a removable, protective cover 112 that can be attached to the back side of the mounting plate 102 by fasteners 110 (such as screws or latches). The cover 112 can be removed (for example, for field service) once the assembly 100 is mounted and all pressure tubing 118 is installed and connected to the corresponding input ports 114. In certain example implementations, the input ports 114 may be mounted on a front side of the mounting plate 102 and in communication with corresponding through-hole bores in the mounting plate 102. In this way, a sensor 104 or other components in the assembly 100 can be serviced in the field even when the system is running without affecting any of the other measurement channels. In certain example implementations, the input ports 114 may include compression seals or the like and configured to connect with pressure tubing 118 from external equipment 122 for which pressure measurements are to be made. In certain implementations, a valve 120 may be placed in-line with the pressure tubing 118 to selectively turn off the pressure to a particular sensor 104 for field replacement or servicing.

In accordance with certain example implementations of the disclosed technology, and in actual practice in certain applications (such as in a gas seal panel replacement) the assembly 100 may also include valves 120 in line with the pressure tubing 118. Such valves 120 may be utilized for functions such as bleeding pressure from the system and/or turning off pressure to replace failed sensors. In certain implementations, the valves 120 may be external devices (as depicted in FIG. 1A). In some implementations, one or more of the valves 124 may be integrated into the input ports 114 of the assembly 100, as described in U.S. Pat. No. 9,470,325, entitled "Single and Grouped Pressure Valves," assigned to Kulite Semiconductor Products, Inc., and incorporated herein by reference.

Certain configurations utilizing the disclosed technology, in conjunction with proper valving, may take up less than 10 cubic feet (0.28 cubic meters), whereas a conventional the gas panel may take up 100 cubic feet (2.8 cubic meters).

Figure 2:
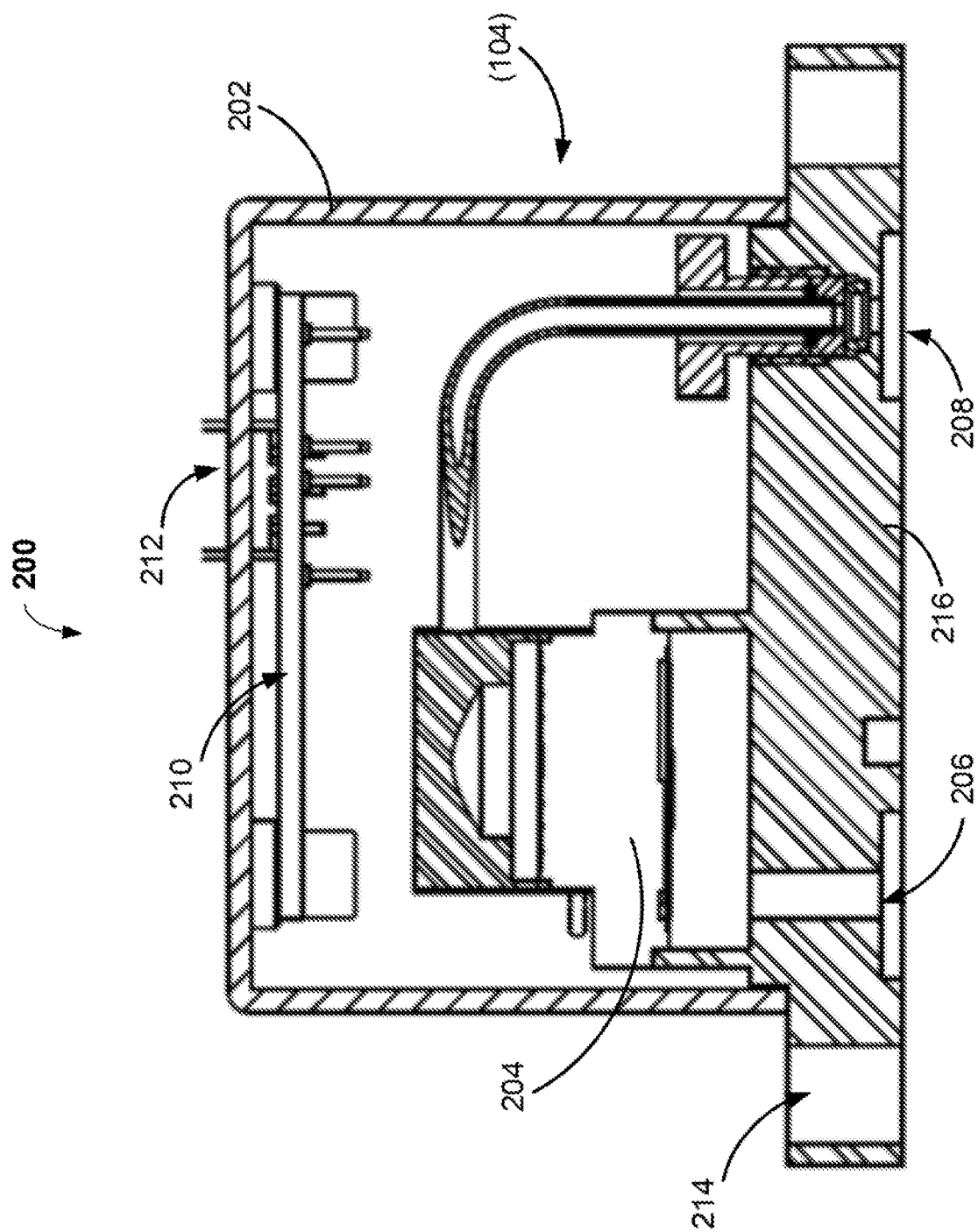
FIG. 2 depicts an individual differential pressure sensor 200 that may be utilized in the scanner assembly 100 of FIG. 1A (as also depicted in FIG. 3 and FIG. 4), according to an example implementation of the disclosed technology.

FIG. 2 shows a cross-sectional side view of an individual differential pressure sensor 200. In certain example implementations, one or more of such sensors 200 may be used in combination with the other sensors 104 as discussed with reference to FIG. 1A (as will be discussed below with reference to FIG. 3). It should be understood that the pressure sensor 200 described here may embody other transducer types and/or configurations, depending on the application.

In accordance with certain example implementations of the disclosed technology, and as depicted in FIG. 2, a differential wet-wet oil filled header 204 may be utilized to configure the pressure sensor 200 as a differential transducer. In accordance with this example configuration, the header 204 may be in communication with a first port 206 and a second port 208 such that one side of a diaphragm within the header 204 may be in communication with the first sensing port 206, while the other side of the diaphragm may be in communication with the second sensing port 208 to provide a differential measurement configuration. One technical advantage of the disclosed technology is that different transducer configurations may utilize the same (or substantially similar) housing 202, connectors 212, etc. for use with different applications and configurations. For example, in certain implementations of the disclosed technology, a sensor having a single input port (for example, sensor 104 as shown in FIG. 1A) may utilize housing components and/or base footprint compatible with such a configuration such that adjacent sensors may also be mounted to the mounting plate. When a differential transducer (as shown in FIG. 2) is utilized, the associated assembly may have a footprint (or may be rotated 90 degrees) such that the first sensing port 206 and second sensing port 208 of the sensor 200 aligns with two corresponding and adjacent input ports and through-hole bores in the mounting plate of the scanner assembly (as will be discussed below with reference to FIG. 3).

In accordance with certain example implementations of the disclosed technology, the sensor 200 (and/or any of the other sensors 104) may be attached to the back side of the housing mounting plate with screws or fasteners (not shown) in the mounting holes 214, such that the through-hole bores align with and are in communication with the corresponding sensing ports of the sensors while forming a seal between the sensor base 216 and the mounting plate 102 to prevent pressure from escaping.

With continued reference to FIG. 2, and according to an example implementation, the pressure sensor 200 may include a circuit board 210, for example, to connect the header 204 with a connector 212. In certain example implementations, the circuit board 210 may include ID components (such as a memory chip and/or other components as discussed above) for identification, compensation, etc. In certain example implementations, the circuit board 210 may include compensation circuitry.

FIG. 3 depicts a pressure scanner assembly 300, that may be the same, or may include similar components as discussed in the assembly 100 of FIG. 1A. In this example implementation, one or more of the sensors 104 may be a differential sensor, such as the pressure sensor 200 as discussed above with reference to FIG. 2, while other sensors 104 may be characterized as single input port (i.e., absolute) sensors. FIG. 3 depicts the left-most six sensors 104 in a first orientation (i.e., lengthwise into the page) while the rightmost sensor (a differential sensor 200) is in a second orientation and in communication with adjacent two pressure ports 114. In certain example implementations, any of the sensors 104 (including differential sensors 200) may have the same footprint dimensions and may be installed in a common orientation (as will be depicted in FIG. 4A).

In applications where a differential sensor 200 is utilized, and according to certain example implementations, the first and second port (such as port 206 and port 208 as discussed above with reference to FIG. 2) of the differential pressure transducer may be coupled to corresponding input ports of the scanner assembly and may be mounted in contact with the scanner mounting plate 102 and sealed using O-ring face seals to provide a sealed channel for delivery and measurement of pressure. According to an example implementation of the disclosed technology, the sensor 200 may be configured to attach to the scanner mounting plate 102 using screws which may be easily accessed to enable field replacement or servicing of a pressure sensor 200.

In one example implementation of the disclosed technology, replacement of a pressure sensor 200 in the field may be accomplished by closing a valve 120 to block the pressure, removing a mating connector 108 of a connecting cable 109 from the associated sensor connector, removing mounting screws, removing the sensor 200, and installing in a new one by reverse steps.

Different applications may employ different sensor types. For example, certain applications may require absolute pressure measurements. In such applications, and according to an example implementation, the associated sensor may require only a single port. In another example implementation, the header may be non-oil filled depending on the pressure range and media type. Other application may utilize a differential wet-wet oil filled header. In another example implementation, the header may be oil-filled only on one side depending on pressure range a media type. Certain applications of the disclosed technology may include various combinations of the different sensor types.

FIG. 4A depicts a cross-sectional end-view of a pressure scanner assembly 400 (which may correspond to the assembly 100 as shown in FIG. 1A, FIG. 1B, and FIG. 3), having both a differential sensor 200 and a single-input sensor 402 installed in the assembly 100, according to an example implementation of the disclosed technology. In certain example implementations, screws 406 or other fasteners may be utilized to attach the cover 112 to the mounting plate 102.

FIG. 4B depicts a detailed inset view of an interface between an installed differential sensor 200 and the mounting plate 102. As discussed previously, a differential pressure sensor 200 may be coupled to corresponding input ports and may be mounted in contact with the scanner mounting plate 102 and sealed using O-ring face seals 408, for example, to provide a sealed channel for delivery and measurement of pressure to the first port 206 and a second port 208. In accordance with certain example implementations of the disclosed technology, a registration feature 410 may be utilized to ensure that the sensors 114 are mounted in a correct orientation, for example, so that technicians do not confuse a main pressure input port with a reference pressure input port. According to an example implementation of the disclosed technology, the sensor 200 may be configured to attach to the scanner mounting plate 102 using screws which may be easily accessed to enable field replacement or servicing of a pressure sensor 200.

As shown on the right-hand side of FIG. 4A, a single-input pressure sensor 402 may have footprint dimensions similar to the dual-input pressure sensor 200 and may be configured to occupy two ports, but to cover-up one of the corresponding through-hole bores and associated input ports 404. In certain example implementations, a gasket, plug or O-ring 408 may be utilized to seal the unused port 404. In other example implementations (not shown) single-input sensors may be configured to occupy only one interface port per sensor to provide maximum sensor density within the assembly.

FIG. 5 is a flow diagram of a method 500 for replacing a field-replaceable pressure sensor in a compact, multi-channel pressure scanner assembly during operation, and without disturbing other sensors in the assembly, according to an example implementation of the disclosed technology. In block 502, the method 500 includes closing one or more valves to block pressure supplied to a first pressure sensor of a compact, multi-channel pressure scanner assembly. In block 504, the method 500 includes unplugging, from a connector of the first pressure sensor, a communication cable electrically connected to a multi-channel data acquisition system of the scanner assembly. In block 506, the method 500 includes removing the first pressure sensor from a mounting plate of the scanner assembly. In block 508, the method 500 includes installing and securing a second pressure sensor to the mounting plate in a position previously occupied by the first pressure sensor. In block 510, the method 500 includes plugging the communication cable into a connector of the second pressure sensor. In block 512, the method 500 includes opening the one or more valves to supply pressure to the second pressure sensor.

In certain example implementations, removing the first pressure sensor includes removing one or more fasteners that are configured to secure the first pressure sensor to the mounting plate of the scanner assembly.

In certain example implementations, installing and securing the second pressure sensor to the mounting plate can include installing an O-ring between the second pressure sensor and the mounting plate and axially aligned with a sensor port of the second pressure sensor and a through-hole bore of the mounting plate.

According to an example implementation of the disclosed technology, at least some of the through-hole bores are spaced relative to adjacent through-hole bores to provide alignment with both sensor ports of a differential field-replaceable pressure sensor having two sensor ports.

In certain example implementations, the mounting plate can further include one or more mounting flanges configured for mounting the mounting plate to an external structure.

In certain example implementations, the scanner assembly can include a removable cover configured for selective attachment to the mounting plate.

In certain example implementations, the scanner assembly can include a plurality of input ports that are configured for coupling with pressure tubing to receive pressure for sensing by the corresponding two or more field-replaceable pressure sensors.

According to an example implementation of the disclosed technology, the scanner assembly can include a multi-channel data acquisition system that is field-replaceable.

In certain example implementations, the multi-channel data acquisition system is further configured to output, via a digital bus, multiplexed data received from the two or more field-replaceable pressure sensors.

In accordance with certain example implementations of the disclosed technology, the scanner assembly is characterized by (approximate) dimensions having length by width by height of 46 cm by 26 cm by 26 cm (18 in by 10 in by 10 in) and occupying an (approximate) volume of about 0.03 cubic meters. In certain example implementations, the dimensions may be adjusted to provide an assembly having a volume ranging from about 0.02 cubic meters to about 0.04 cubic meters.

In certain example implementations, one or more of the field-replaceable pressure sensors are oil-filled pressure sensors.

In certain example implementations, the field-replaceable pressure sensors are uniquely identifiable by the multi-channel data acquisition.

In certain example implementations, at least a portion of the plurality of input ports are coupled with corresponding pressure tubing to receive pressure, wherein one or more external valves are coupled with the pressure tubing to selectively control the received pressure.

Certain example implementations of the disclosed technology allow for a great deal of flexibility while keeping a compact size allowing for replacement of a large panel installation with a much smaller pressure scanner panel and maintaining flexibility and robustness. Certain example implementations of the disclosed technology allow for both size and cost savings over the traditional individual transmitter approach.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "includes," and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices, and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. A pressure scanner assembly, comprising:
   a mounting plate comprising a back-side sensor mounting interface configured for simultaneous mounting of single-input and dual-input pressure sensors;
   a plurality of field-swappable pressure sensors attached to the sensor mounting interface, wherein each of the plurality of field-swappable pressure sensors are in communication with one or more corresponding input ports disposed on a front-side of the mounting plate; and
   a multi-channel data acquisition system configured to receive pressure signals from the plurality of field-swappable pressure sensors.

2. The pressure scanner assembly of claim 1, wherein the plurality of field-swappable pressure sensors comprises at least one single-input pressure sensor and at least one dual-input pressure sensor.

3. The pressure scanner assembly of claim 1, wherein each of the plurality of field-swappable pressure sensors are seal mounted to the sensor mounting interface and in communication with the one or more input ports via corresponding through-hole bores extending from a front side to a back side of the mounting plate.

4. The pressure scanner assembly of claim 1, wherein the plurality of field-swappable pressure sensors comprise sensor combinations characterized by or more of: non-oil filled, wet-wet oil filled, and wet-dry oil filled.

5. The pressure scanner assembly of claim 1, wherein in the input ports are configured for coupling with pressure tubing to receive pressure for sensing by the corresponding plurality of field-swappable pressure sensors.

6. The pressure scanner assembly of claim 1, wherein the multi-channel data acquisition system is field-swappable.

7. The pressure scanner assembly of claim 1, wherein the multi-channel data acquisition system is further configured to output, via a digital bus, multiplexed data received from the plurality of field-swappable pressure sensors.

8. The pressure scanner assembly of claim 1, wherein at least a first pressure sensor of the plurality of field-swappable pressure sensors is swappable during operation of a second pressure sensor of the plurality of field-swappable pressure sensors.

9. The pressure scanner assembly of claim 1, further comprising a removable cover, wherein the assembly is characterized by dimensions having a length by width by height of 46 cm by 26 cm by 26 cm and occupying a volume of less than 0.03 cubic meters.

10. A field serviceable, compact, multi-channel pressure scanner assembly, comprising:
    a housing configured to house pressure sensors and a data acquisition assembly, the housing occupying a volume of less than 0.03 cubic meters, and comprising:
       a mounting plate comprising a plurality of through-hole bores extending from a front side to a back side of the mounting plate and configured for mating with corresponding transducer ports of the pressure sensors; and
       a plurality of input ports disposed on the front side of the mounting plate and in communication with the corresponding plurality of through-hole bores;
    two or more field-replaceable pressure sensors seal mounted to the back side of the mounting plate, each pressure sensor comprising one or more sensor ports, each of the one or more sensor port in communication with corresponding through-hole bores in the mounting plate; and a multi-channel data acquisition system configured to receive pressure signals from the two or more field-replaceable pressure sensors.

11. The assembly of claim 10, wherein at least a portion of the through-hole bores are spaced relative to adjacent through-hole bores to provide alignment with both sensor ports of a differential field-replaceable pressure sensor having two sensor ports.

12. The assembly of claim 10, wherein in the plurality of input ports are configured for coupling with pressure tubing to receive pressure for sensing by the corresponding two or more field-replaceable pressure sensors.

13. The assembly of claim 10, wherein the multi-channel data acquisition system is field-replaceable.

14. The assembly of claim 10, wherein the multi-channel data acquisition system is further configured to output, via a digital bus, multiplexed data received from the two or more field-replaceable pressure sensors.

15. The assembly of claim 10, wherein the assembly is characterized by dimensions having a length by width by height of 46 cm by 26 cm by 26 cm and occupying a volume of less than 0.03 cubic meters.

16. The assembly of claim 10, wherein the two or more field-replaceable pressure sensors are uniquely identifiable by the multi-channel data acquisition system.

17. The assembly of claim 10, wherein at least a portion of the plurality of input ports are coupled with corresponding pressure tubing to receive pressure, wherein one or more external valves are coupled with the pressure tubing to selectively control the received pressure.

18. A method of replacing a field-replaceable pressure sensor in a compact, multi-channel pressure scanner assembly during operation, the method comprising:

closing one or more valves to block pressure supplied to a first pressure sensor of a compact, multi-channel pressure scanner assembly;

unplugging, from a connector of the first pressure sensor, a communication cable electrically connected to a multi-channel data acquisition system of the scanner assembly;

removing the first pressure sensor from a mounting plate of the scanner assembly;

installing and securing a second pressure sensor to the mounting plate in a position previously occupied by the first pressure sensor;

plugging the communication cable into a connector of the second pressure sensor; and opening the one or more valves to supply pressure to the second pressure sensor.

19. The method of claim 18, wherein removing the first pressure sensor comprises removing one or more fasteners that are configured to secure the first pressure sensor to the mounting plate of the scanner assembly.

20. The method of claim 18, wherein installing and securing the second pressure sensor to the mounting plate comprises install an O-ring between the second pressure sensor and the mounting plate and axially aligned with a sensor port of the second pressure sensor and a through-hole bore of the mounting plate.

* * * * *